United States Patent
Tsai (10) Patent No.: US 8,424,927 B2
(45) Date of Patent: Apr. 23, 2013

(54) EASILY DETACHABLE COUPLING STRUCTURE FOR A CASING

(75) Inventor: Tien-Chuan Tsai, Hsinchu County (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 268 days.

(21) Appl. No.: 12/871,085

(22) Filed: Aug. 30, 2010

(65) Prior Publication Data

US 2012/0034020 A1 Feb. 9, 2012

(30) Foreign Application Priority Data

Aug. 6, 2010 (TW) ................ 99215081 U (51) Int. Cl.
*E05C 19/06* (2006.01)
*E05C 1/02* (2006.01)

(52) U.S. Cl.
USPC ........ 292/80; 292/87; 292/137; 292/DIG. 11; 292/DIG. 38; 292/DIG. 63

(58) Field of Classification Search ............ 292/80, 292/81, 85–87, 137, 138, 145, 150, 152, 292/174, DIG. 11, DIG. 38, DIG. 53, DIG. 54, 292/DIG. 63, DIG. 64; 27/DIG. 1; 312/223.2
See application file for complete search history.

(56) References Cited

U.S. PATENT DOCUMENTS

| | | | | |
|---|---|---|---|---|
| 1,050,899 A | * | 1/1913 | Yaeger | 292/86 |
| 3,175,853 A | * | 3/1965 | Gilbertson | 292/86 |
| 4,673,100 A | * | 6/1987 | Reis et al. | 220/324 |
| 5,348,356 A | * | 9/1994 | Moulton | 292/80 |
| 6,297,948 B1 | * | 10/2001 | Buican et al. | 361/679.58 |
| 6,356,436 B1 | * | 3/2002 | Buican et al. | 361/679.58 |
| 6,373,690 B1 | * | 4/2002 | Buican et al. | 361/679.59 |
| 6,375,287 B1 | * | 4/2002 | Lai | 312/223.2 |
| 6,388,874 B1 | * | 5/2002 | Liang et al. | 361/679.57 |
| 6,899,407 B1 | * | 5/2005 | Lai | 312/223.2 |
| 7,009,845 B2 | * | 3/2006 | Chen et al. | 361/726 |
| 7,082,036 B2 | * | 7/2006 | Cheng et al. | 361/726 |
| 7,208,686 B1 | * | 4/2007 | Chen et al. | 174/561 |
| 8,267,443 B1 | * | 9/2012 | Kuo et al. | 292/137 |
| 2005/0046316 A1 | * | 3/2005 | Chen et al. | 312/223.2 |

* cited by examiner

*Primary Examiner* — Carlos Lugo
(74) *Attorney, Agent, or Firm* — Rosenberg, Klein & Lee (57) ABSTRACT

A coupling structure couples first and second casing parts together. The first casing part is formed with a detachment hole. The coupling structure includes one resilient engaging hook projecting from the first casing part and a coupling member disposed between the first and second casing parts and formed with first and second engaging grooves. The resilient engaging hook hooks the first engaging groove in a right direction. The coupling member has a pushing element tending toward the detachment hole. One rigid engaging hook projects from the second casing part and engaging the second engaging groove in a left direction. Manually leftwise movement of the pushing element in the left direction results in simultaneous bending of the resilient engaging hook in the left direction so as to disengage the rigid engaging hook from the second engaging groove, thereby permitting removal of the second casing part from the first casing part.

7 Claims, 8 Drawing Sheets

EASILY DETACHABLE COUPLING STRUCTURE FOR A CASING

This application claims the benefits of the Taiwan Patent Application Serial NO. 099215081 filed on Aug. 6, 2010, the subject matter of which is incorporated herein by reference.

BACKGROUND OF THE INVENTION

1. Field of the Invention

The present invention relates to a coupling structure, more particularly to a coupling structure for coupling first and second casing parts in order to form a casing, which does not require fastener screws for fastening the same and which can be easily detach into two parts if circumstance requires.

2. Description of the Prior Art

Several electronic devices are available around us in order to serve us, such as performing services we need in our daily life. An electronic device conventionally includes a main printed circuit board and a casing enclosing the printed circuit board therein. Several electronic components or elements are mounted on the printed circuit board for different functions. The casing encloses the printed circuit board to protect those electronic components or elements. The casing is further provided with other operating elements, such as a display or keyboard for input of data. The casing is further provided with a heat-dissipation system, waterproof effect or EMI (electromagnetic interference device).

The casing of a conventional electronic device usually includes a lower casing part and an upper casing part disposed above the lower casing part. Generally, a coupling structure or fastener screws are disposed between in order to fasten the lower and upper casing parts into a casing. The preceding means of fastening or assembling results in human labor waste and the other people can vividly observe the fastening positions from an exterior thereof such that the casing may be easily detached or unfastened in order to fetch the interior elements within the casing. In the event, coupling means is used to fasten the upper and lower casing parts to prevent the undesired persons to detach the casing, the latter may encounter the problem of uneasy detachment in future if we want to repair or replace the damage elements within the casing, thereby inconveniencing the user of the electronic device.

SUMMARY OF THE INVENTION

Since coupling means or fastener screws are used to fasten the upper and lower casing parts in the prior art, there may encounter difficulties when disassembling the casing. Therefore, the object of the present invention is to provide a coupling structure for coupling first and second casing parts in order to form a casing. The first casing part is formed with a detachment hole. The coupling structure of the present invention includes a pushing element, manually manipulating of the pushing element results in easy disengagement of the second casing part from the first casing part.

The coupling structure according to the present invention is used for coupling first and second casing parts in order to form a casing, and includes at least one resilient engaging hook projecting from the first casing part and a coupling member disposed between the first and second casing parts for coupling the latter together and formed with a first engaging groove and a second engaging groove. The resilient engaging hook of the first casing part hooks the first engaging groove in a right direction. The coupling member includes an L-shaped pushing element projecting toward the detachment hole in the first casing part. At least one rigid engaging hook projects from the second casing part and engaging the second engaging groove in a left direction opposite to the right direction.

The pushing element is exposed from the detachment hole in the first casing part such that manually leftwise movement of the pushing element in the left direction along a detachment path results in simultaneous bending of the resilient engaging hook in the left direction so as to disengage the rigid engaging hook from the second engaging groove, thereby permitting removal of the second casing part from the first casing part.

In one embodiment of the present invention, a rigid detachment tool can be inserted into the casing via the detachment hole so as to push the pushing element in the left direction. The detachment tool in fact is a screwdriver having a straight head.

In another embodiment of the present invention, the pushing element is exposed from the detachment hole in the first casing part such that the pushing element can be manually manipulated in the left direction without the requirement of a detachment tool.

The coupling member of the coupling structure of the present invention is further formed with a guiding slot extending along the detachment path. The first casing part further has a guiding plate extending through the guiding slot to engage the same in such a manner that manually leftwise movement of the pushing element in the left direction simultaneously results in displacement of the guiding plate relative to the guiding slot. The guiding plate has a slot-engaging slit for engaging one end of the guiding slot after assembly.

In one embodiment of the present invention, the first casing part has three of the resilient engaging hooks. The coupling member is formed with three of the first engaging grooves and three of the second engaging grooves while the second casing part is formed with three of the rigid engaging hooks.

When the coupling structure of the present invention is compared to the prior art ones, the present coupling structure is used for coupling the first and second casing parts and no fastener screw is required for fastening the first and second casing parts in order to form the casing. The coupling structure of the present invention includes a coupling member such that the resilient engaging hook of the first casing part and the rigid engaging hook of the second casing part respectively engaging the first and second engaging grooves in two opposite directions. When it is desired to disassemble the casing fastened by the coupling structure of the present invention, manually leftwise movement of the pushing element in the left direction along the detachment part results in simultaneous bending of the resilient engaging hook in the left direction so as to disengage the rigid engaging hook from the second engaging groove, thereby permitting easy removal of the second casing part from the first casing part and without damaging the interior parts of the casing.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
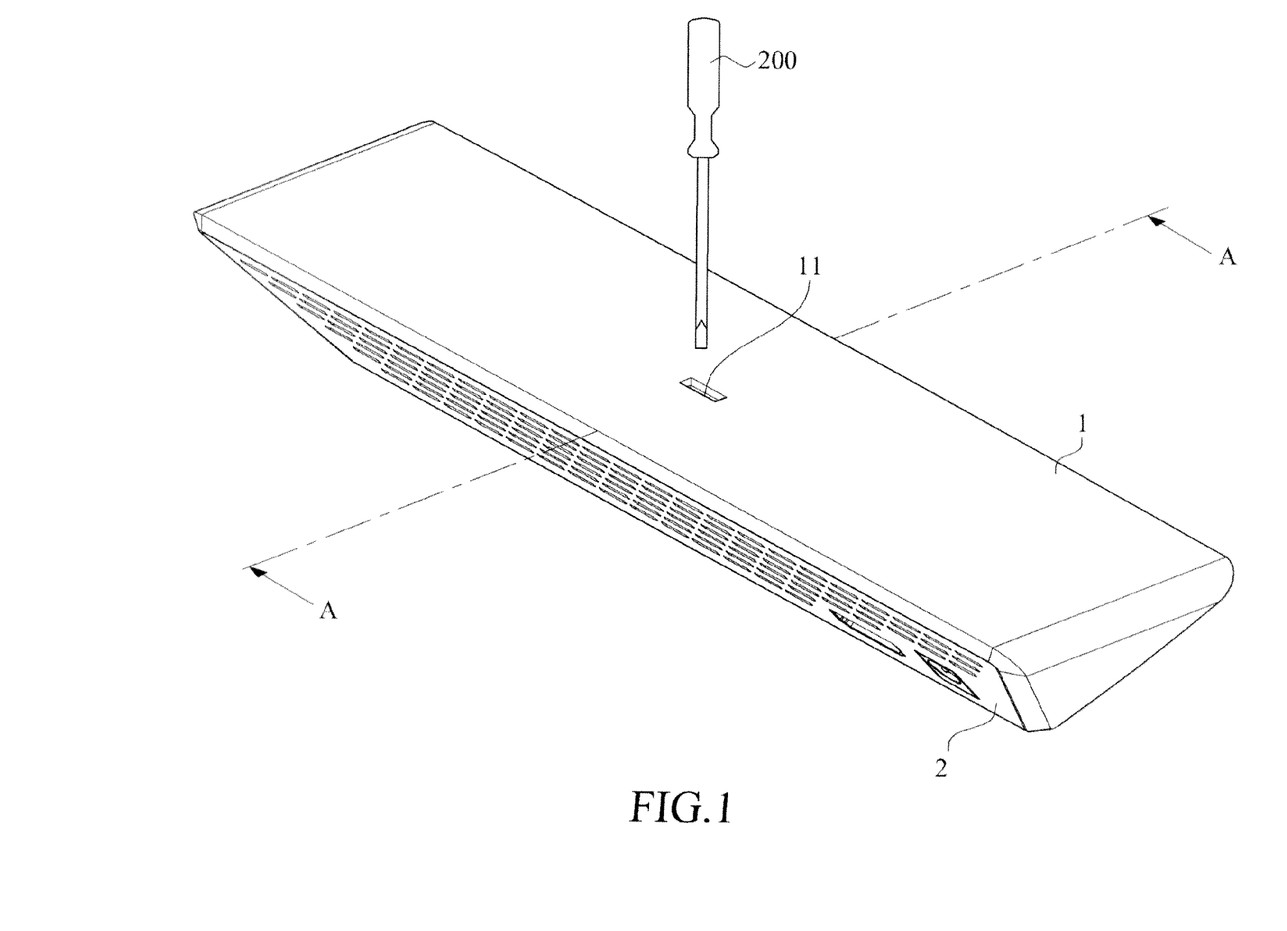
FIG. 1 shows a perspective view of the first embodiment of a coupling structure of the present invention for coupling first and second casing parts into a casing.

FIG. 1 shows a perspective view of the first embodiment of a coupling structure of the present invention. The coupling structure of the present invention is used for coupling first and second casing parts 1, 2 into a casing. The first casing part 1 is formed with a detachment hole 11 to permit extension of an L-shaped pushing element 34 (not visible in FIG. 1) therethrough or insertion of a rigid detachment tool 200 into the casing in order to disengage the second casing part 2 from the first casing part 1. The rigid detachment tool 200 in fact is a screwdriver having a straight head or flat head (see FIG. 5). In this embodiment, the first casing part 1 includes a major flat plate and two triangular minor plates projecting erectly from two opposite ends thereof and the detachment hole 11 is formed through the major flat plate at the middle section. The second casing part 2 is generally V-shaped when viewed from a lateral side and is located below the first casing part 1.

Figure 2:
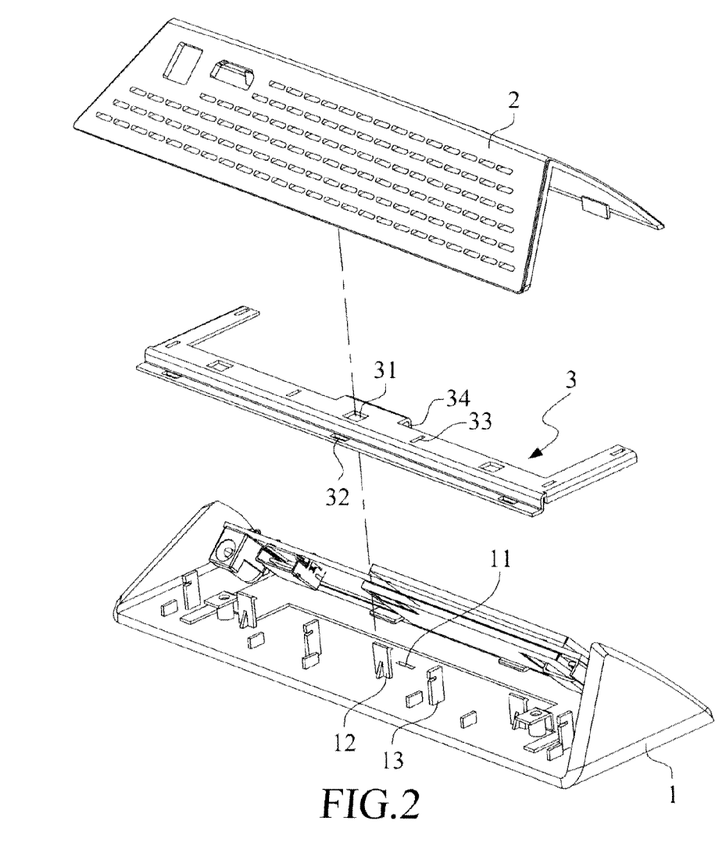
FIG. 2 shows an exploded and upside down view of the first embodiment of the coupling structure of the present invention for coupling the first and second casing parts into the casing.
Figure 3:
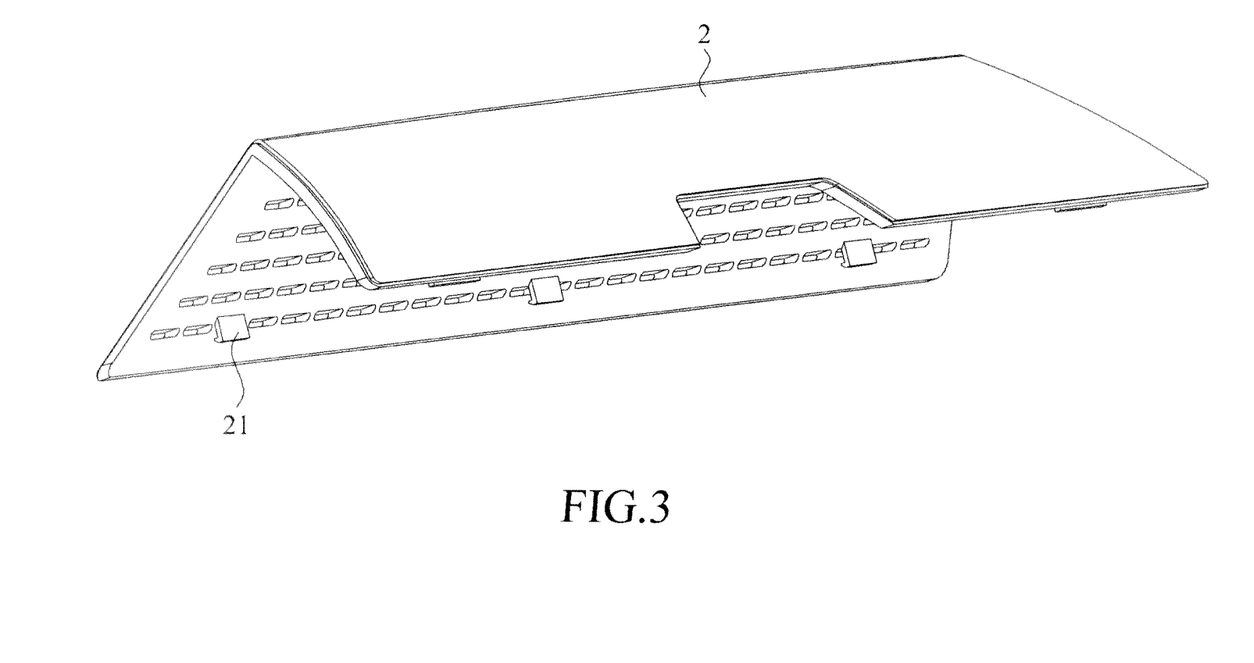
FIG. 3 shows a perspective view of the second casing part, which is fastened to the first casing part by the coupling structure of the present invention.

Referring to FIGS. 2 and 3, wherein FIG. 2 shows an exploded and upside down view of the first embodiment of the coupling structure of the present invention for coupling the first and second casing parts 1, 2 into the casing while FIG. 3 shows a perspective view of the second casing part 2, which is fastened to the first casing part 1 by the coupling structure of the present invention. The coupling structure of the present invention includes three resilient hooks 12, 4 guiding plates 13 and a coupling member 3 and the L-shaped pushing element 34 projecting perpendicularly from a major portion of the coupling member 3. As best shown in FIG. 3, the coupling structure of the present invention further includes three rigid engaging hooks 21 formed an inner surface and projecting interior of the second casing part 2.

Three resilient hooks 12 and 4 guiding plates 13 are formed on an inner surface of the major flat plate of the first casing part 1 and project inwardly therefrom. The resilient hooks 12 and 4 guiding plates 13 are alternately disposed and are staggered relative to one another along a predetermined line. One of the resilient hooks 12 is located closely to the detachment hole 11 in the major flat plate of the first casing part 1.

The coupling member 3 is disposed between the first and second casing parts 1, 2 for coupling the latter two together. The coupling member 3 is generally a plate member, is formed with three first engaging groove 31, three second engaging groove 32 and 4 guiding slots 33, wherein prior to assembly each of the first engaging groove 31 is aligned with a respective resilient engaging hook 12 of the first casing part 1 while each of the second engaging groove 32 is aligned with a respective rigid engaging hook 21 of the second casing part 2. Moreover, each of the guiding slots 33 is aligned with a respective guiding plate 13 of the first casing part 1 and the L-shaped pushing element 34 projects perpendicularly and integrally from the plate member, and tending towards the detachment hole 11 in the first casing part 1.

Figure 4:
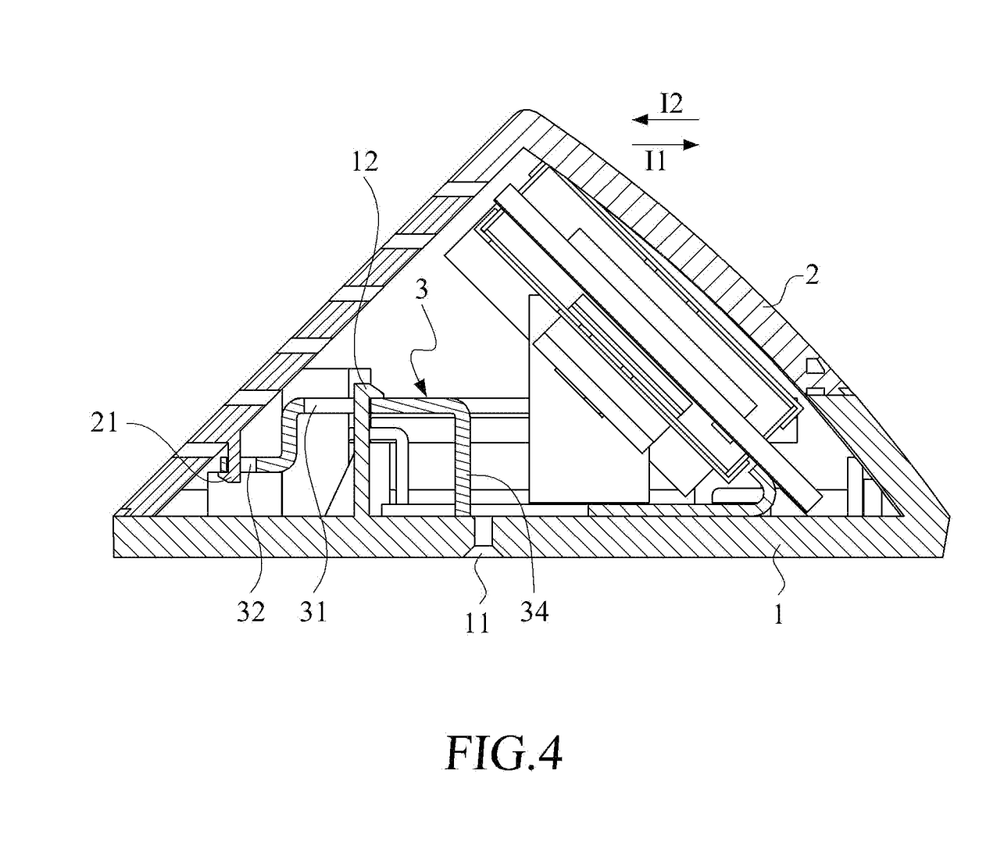
FIG. 4 is a cross-sectional view of the casing fastened by the first embodiment of the coupling structure of the present invention.

FIG. 4 is a cross-sectional view of the casing taken along lines A-A in FIG. 1 and the casing is fastened by the first embodiment of the coupling structure of the present invention. As illustrated, after assembly, the resilient engaging hooks 12 of the first casing part 1 respectively engaging the first engaging grooves 31 of the coupling member 3 in the right direction I1 while the rigid engaging hooks 21 of the second casing part 2 respectively engaging the second engaging grooves 32 of the coupling member 3 in the left direction I2 opposite to the right direction I1. At that time, the pushing element 34 is located closely to the detachment hole 11 in the first casing part 1.

Figure 5:
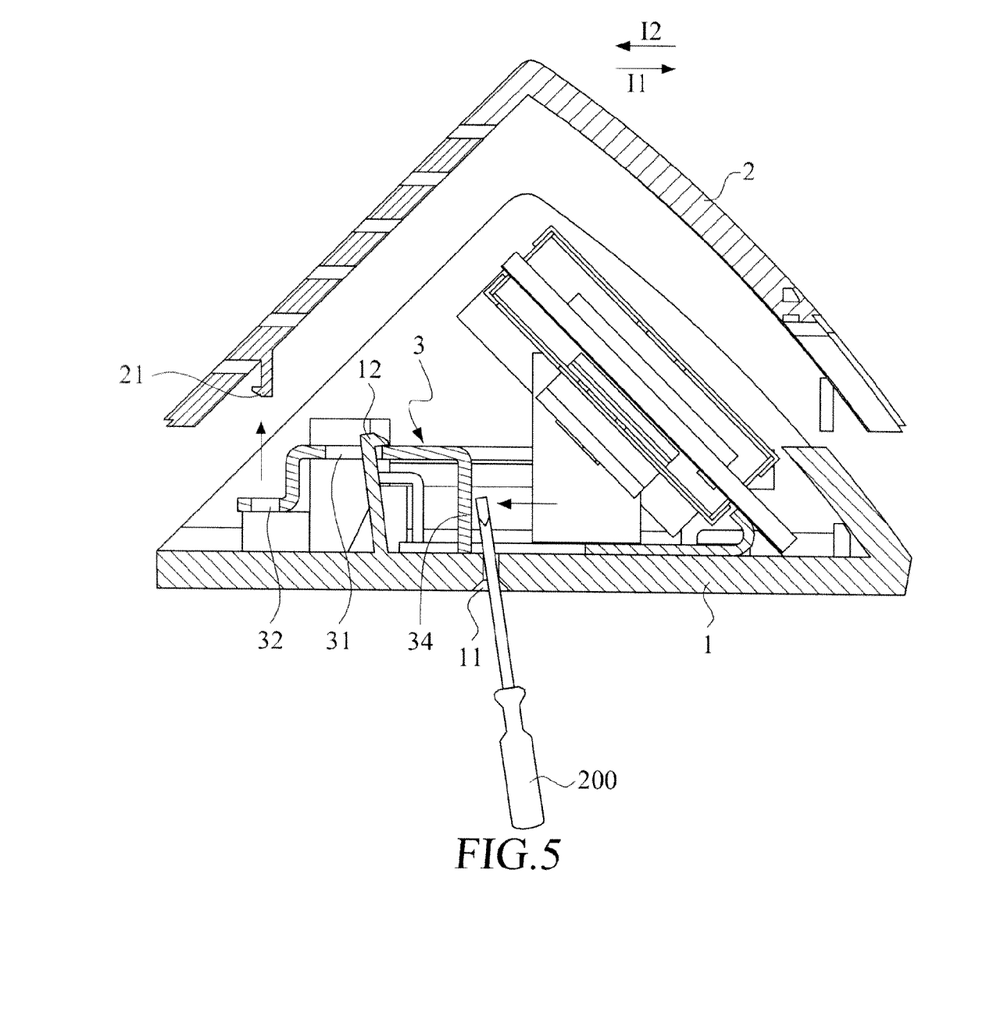
FIG. 5 is a partially cross-sectional view of the casing, illustrating how the coupling structure of the present invention is operated by a detachment tool to detach the second casing part from the first casing part.

FIG. 5 is a partially cross-sectional view of the casing, illustrating how the coupling structure of the present invention is operated by a detachment tool to detach the second casing part 2 from the first casing part 1. When it is desired to disengage the second casing part 2 from the first casing part 1 (or to disassemble the casing), the screwdriver 200 is inserted into the casing via the detachment hole 11 in the first casing part 1. Afterward, manually leftwise movement of the pushing element 34 by means of the screwdriver 200 results in simultaneous leftwise bending of the resilient engaging hooks 12 in the left direction I2 along a detachment path RW, thereby disengaging the rigid engaging hooks 21 respectively from the second engaging grooves 32 and permitting removal of the second casing part 2 from the first casing part 1.

Figure 6:
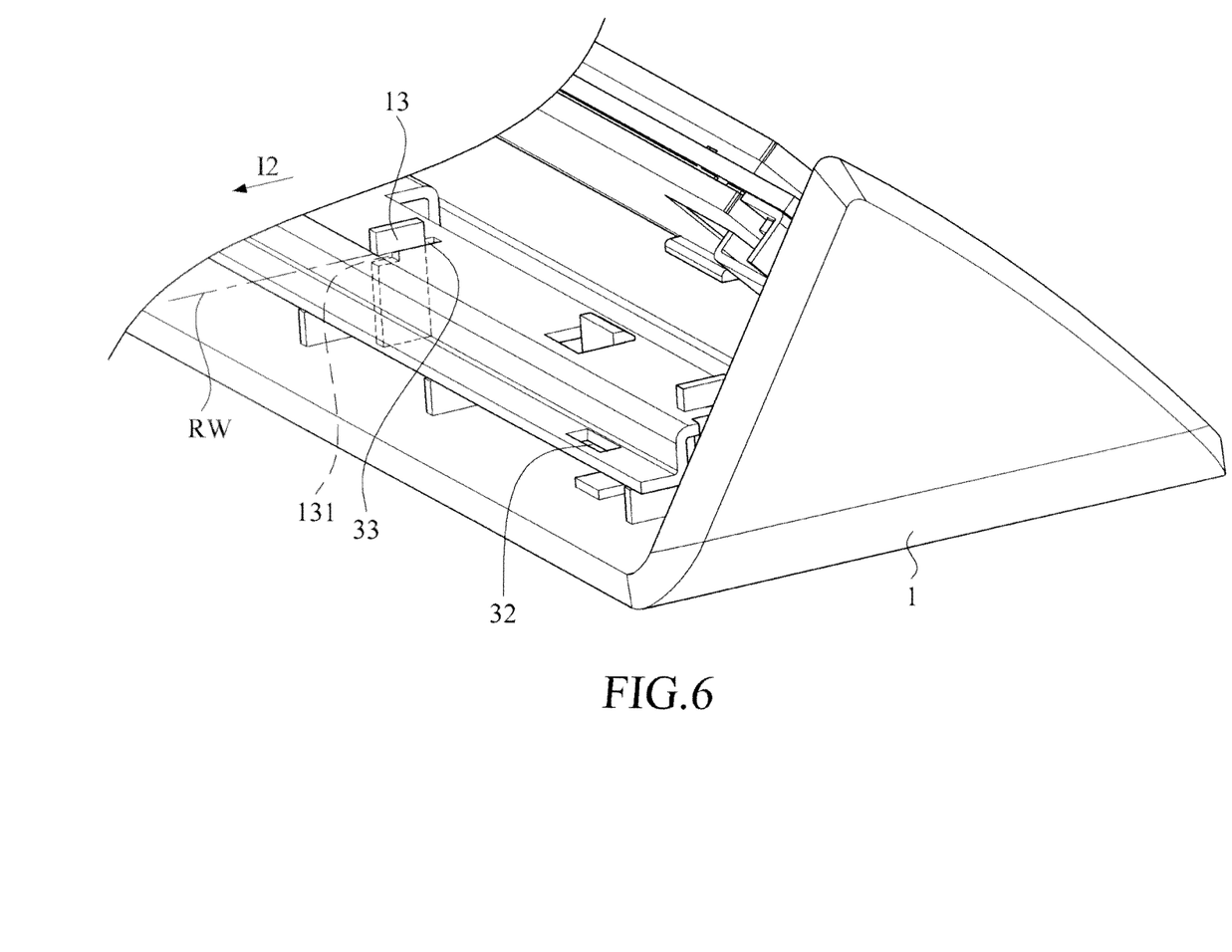
FIG. 6 is a fragmentary partial view of the first casing part, illustrating how a guiding plate of the coupling structure of the present invention is guided to engage a guiding slot within the casing.

FIG. 6 is a fragmentary partial view of the first casing part 1, illustrating how the guiding plates 13 of the coupling structure of the present invention are guided to engage the guiding slots 33 of the coupling member 3 within the casing. After assembly, since each of the guiding slots 33 extends along the detachment path RW, the slot-engaging slits 131 of the guiding plates 13 engaging the respective ends of the guiding slots 33. Note that, the leftwise movement of the coupling member 3 (in the left direction I2) along the detachment path RW in FIG. 5 is enhanced due to presence of the slot-engaging slits 131 in the guiding plates 13. In other words, the leftwise movement of the coupling member 3 (the pushing element 34 is pushed in the left direction I2 by the tool 200) results in simultaneous displacement of the guiding plates 13 relative to the guiding slots 33, thereby disengaging the second casing part 2 from the first casing part 1.

Figure 7:
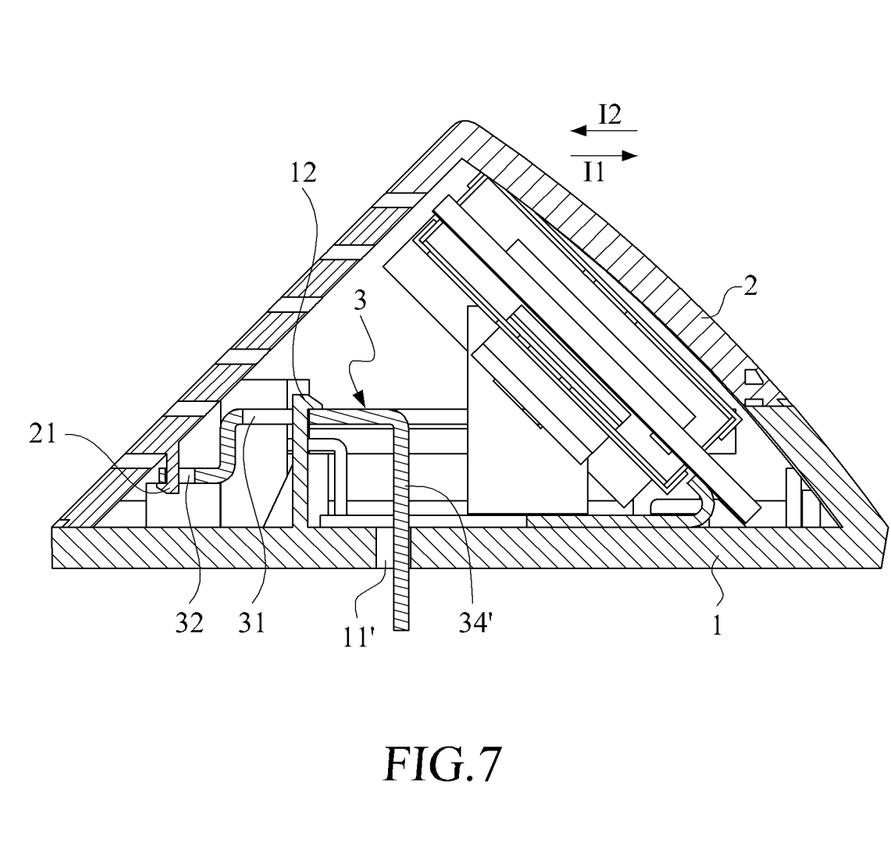
FIG. 7 is a cross-sectional view of the casing fastened by the second embodiment of the coupling structure of the present invention.
Figure 8:
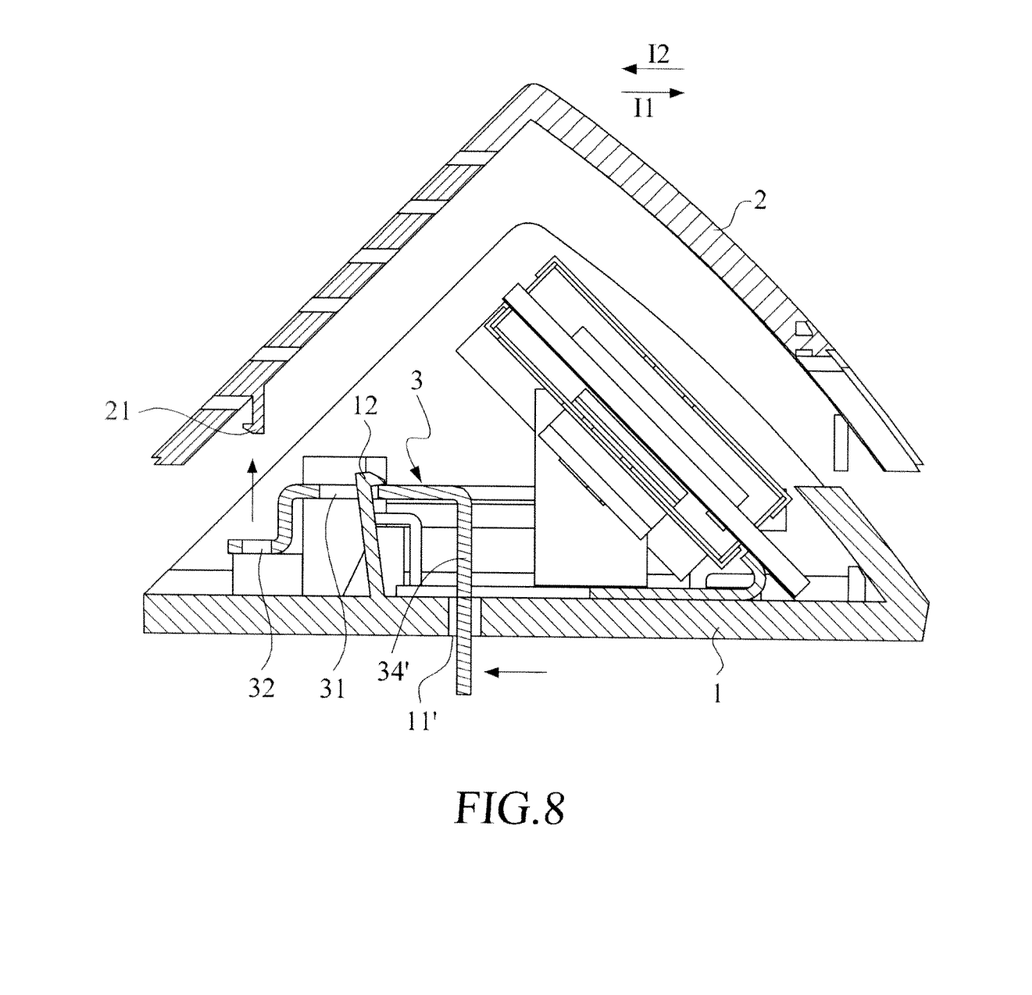
FIG. 8 is a partially cross-sectional view of the casing, illustrating how the second embodiment of the coupling structure of the present invention is operated by the detachment tool to detach the second casing part from the first casing part.

Referring to FIGS. 7 and 8, wherein FIG. 7 is a cross-sectional view of the casing fastened by the second embodiment of the coupling structure of the present invention while FIG. 8 is a partially cross-sectional view of the casing, illustrating how the second embodiment of the coupling structure of the present invention is operated by the detachment tool to detach the second casing part from the first casing part. The second embodiment of the coupling structure of the present invention is similar to the previous embodiment, except in that the L-shaped pushing element 34' of the coupling member 3 is exposed from the detachment hole 11' in the first casing part 1 and the detachment hole 11' has a width larger than that of cross-section of the pushing element 34' in such a manner that no detachment tool is needed when disassembling the casing. In other words, the leftwise movement of the coupling member 3 in the left direction l2 can be accomplished by manually manipulating the pushing element 34' along the detachment path RW, thereby disengaging the second casing part 2 from the first casing part 1, as best shown in FIG. 8.

As described above, unlike to the conventional coupling structure, no fastener screw is required in the coupling structure of the present embodiment for fastening the first and second casing parts 1, 2 in order to form the casing. In addition, the casing assembled or fastened by the coupling structure of the present invention can be easily disassembled if circumstance requires without damaging the interior parts of the casing.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A coupling structure for coupling first and second casing parts in order to form a casing, the first casing part being formed with a detachment hole, the coupling structure comprising:

at least one resilient engaging hook projecting from the first casing part;

a coupling member disposed between the first and second casing parts for coupling the latter together, said coupling member being formed with at least one first engaging groove and at least one second engaging groove, said resilient engaging hook of the first casing part engaging a corresponding said first engaging groove in a right direction, said coupling member including a pushing element projecting toward the detachment hole in the first casing part; and at least one rigid engaging hook projecting from the second casing part and engaging a corresponding said second engaging groove in a left direction opposite to said right direction;

wherein, manually leftwise movement of said pushing element of said coupling member in said left direction along a detachment path results in simultaneous bending of said resilient engaging hook in said left direction and disengagement of said rigid engaging hook from said second engaging groove, thereby permitting removal of the second casing part from the first casing part.

2. The coupling structure as defined in claim 1, wherein a rigid tool is adapted to be inserted through the detachment hole in the first casing part to push said pushing element manually in said leftwise movement to result in disengagement of said rigid engaging hook from said second engaging groove in said coupling member.

3. The coupling structure as defined in claim 2, wherein said rigid tool is a screwdriver having a straight head.

4. The coupling structure as defined in claim 1, wherein said pushing element of said coupling member is exposed from the detachment hole in the first casing part.

5. The coupling structure as defined in claim 1, wherein said coupling member is further formed with a guiding slot extending along said detachment path, the first casing part further having a guiding plate extending through to engage said guiding slot in such a manner that manually leftwise movement of said pushing element of said coupling member in said left direction simultaneously results in displacement of said guiding plate relative to said guiding slot.

6. The coupling structure as defined in claim 5, wherein said guiding plate has a slot-engaging slit for engaging one end of said guiding slot in said coupling member after assembly.

7. The coupling structure as defined in claim 1, wherein the first casing part has three of said resilient engaging hooks, said coupling member being formed with three of said first engaging grooves and three of said second engaging grooves, the second casing part being formed with three of said rigid engaging hooks.

* * * * *